Feb. 19, 1946.　　　A. J. AUKERS　　　2,395,243
CYLINDER HEAD GASKET
Filed June 26, 1944
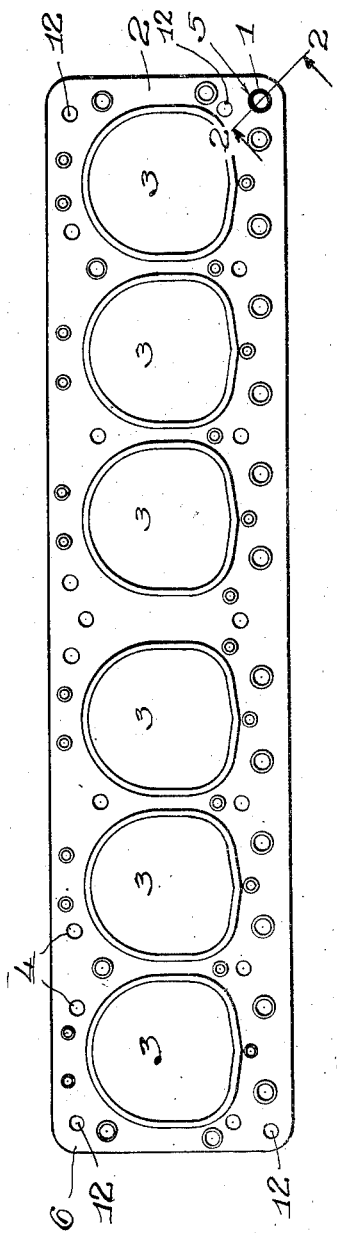
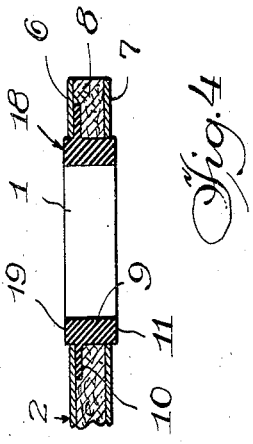
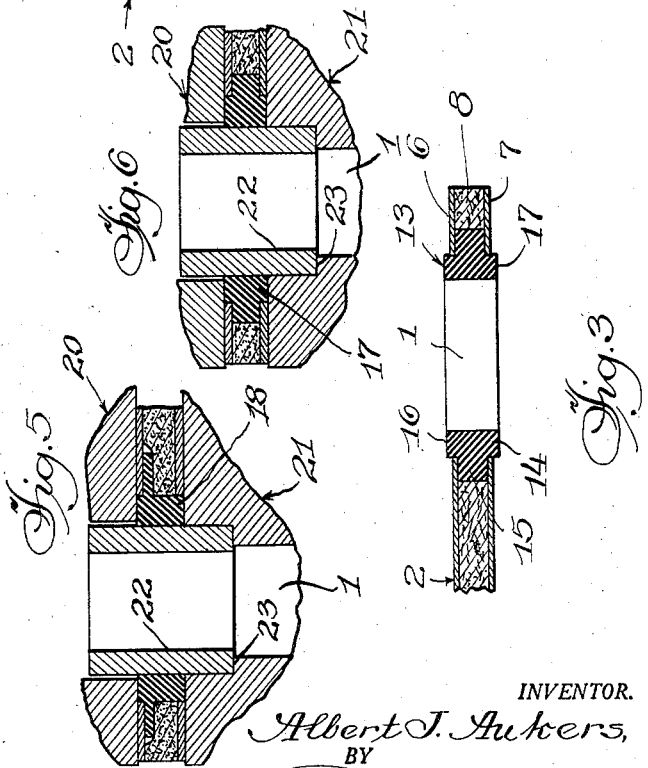
INVENTOR.
Albert J. Aukers,
BY
Parkinson + Lane
Attys.

Patented Feb. 19, 1946

2,395,243

UNITED STATES PATENT OFFICE 2,395,243

CYLINDER HEAD GASKET

Albert John Aukers, Chicago, Ill., assignor to Victor Manufacturing & Gasket Company, Chicago, Ill., a corporation of Illinois Application June 26, 1944, Serial No. 542,069

10 Claims. (Cl. 288—23)

The present invention relates to cylinder head gaskets and especially to a novel grommet construction adapted to be permanently assembled in the opening through which is transmitted the lubricant or oil under pressure for lubricating the operating parts of the engine. Difficulty has been encountered in prior gaskets due to oil leakage around the oil opening through which this oil under pressure is transmitted, for the reason that pressure imposed upon the gasket thereat is varied or non-uniform due to the opening being located outside the stud line area of the clamping bolts.

Among the objects of the present invention is to provide a novel means for successfully preventing oil leakage about the oil opening for transmitting the oil or lubricant under pressure to the operating parts of motors, particularly to those of the overhead valve type.

A further object of this invention is to provide a cylinder head type of gasket with a novel grommet construction for use in the oil and/or water openings of the gasket to prevent leakage thereat.

Another object of the present invention is to provide a novel construction and arrangement whereby the resilient sealing grommet is confined and prevented from being displaced in such manner as to partially obstruct the opening therethrough and passage of the oil or fluid under pressure.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a top plan view of a cylinder head gasket embodying the novel invention.

Figure 2 is an enlarged fragmentary view in vertical cross section taken in a plane represented by the line 2—2 of Figure 1.

Figures 3 and 4 are views similar to Figure 2 but showing alternate forms of rubber grommets embodied in the oil opening.

Figure 5 is a fragmentary view in vertical cross section through a gasket and grommet of the type disclosed in Figure 4, but mounted and compressed between a cylinder head and block and with a sleeve arranged in a manner to confine the grommet on its inner diameter.

Figure 6 is a view similar to Figure 5 but showing the grommet structure of Figure 3 confined on its inner diameter.

Referring more particularly to the illustrative embodiment disclosed in the drawing, the novel invention comprises a grommet adapted to be inserted into the oil opening 1 of a gasket 2 which is shown as of the cylinder head type having the usual combustion openings 3, bolt holes 4 and additional holes for the passage of water or other cooling fluid and oil or lubricant.

The novel grommet 5 shown in Figures 1 and 2 is preferably constructed of a compounded synthetic rubber having oil and water resistant properties adapted to be mounted within the oil hole 1 for preventing leakage thereat of the oil or lubricant being forced under pressure through this hole for the purpose of lubricating the motor operating parts in the cylinder head.

The gasket is shown of the metal clad type in which the upper and lower layers 6 and 7 may be of steel, copper or other metal or material suitable for the purpose and encasing therebetween a layer of asbestos or other suitable gasketing material 8. The grommet shown in Figure 2 comprises an annular ring or washer 9 having at or adjacent its upper surface an annular heel or flange 10 adapted to project a substantial distance into the body of the gasket and beneath the upper metal layer 6 and thereby anchored permanently in the opening 1. The lower edge 11 of the ring or washer 9 extends a substantial distance below the surface of the outer or bottom layer 7 in such manner that when the gasket is mounted in position and the bolts tightened, the compression of the fastening means will compress the grommet and effectively seal against oil leakage, even though this opening is outside the stud line area defined by the bolt holes 12.

Figure 3 discloses an alternate form of grommet 13 in which the ring 14 is provided intermediate its opposite edges with an annular heel or projection 15 adapted to conformably fit and seat between the layers 6 and 7 and with its opposite edges 16 and 17 projecting a substantial amount beyond the opposite faces of the gasket to give optimum sealing about the oil hole 1.

Figure 4 discloses a further alternate construction of grommet 18 which is quite similar to that shown in Figure 2 except that the upper edge 19 also projects beyond the upper face of the gasket in the manner shown in Figure 3.

In Figures 5 and 6 the grommets are shown compressed between the cylinder head 20 and the cylinder block 21, but with the inner diameter of the grommets confined by a sleeve 22 of metal or the like pressed fitted into an opening in the block and against the shoulder 23, and clearing into an opening in the head. The inner diameter of the opening in the head into which the sleeve clears, is larger than the outer diameter of the sleeve by approximately 1/16 inch. The inner diameter of the grommet is preferably within approximately .010 inch of the outer diameter of the sleeve to permit ease of installation of the cylinder head gasket.

The sleeve 22 is preferably employed where the medium being sealed is under pressure and wherein more positive confinement of the resilient grommet is necessary to seal this pressure. Usually in the water openings the grommet may be permitted to displace inwardly toward the opening without any undue reduction in the size of the opening or limitation in the passage of the cooling fluid. But where no reduction in the size of the opening may be permitted or where positive confinement of the inner diameter of the grommet is desired or required, the invention comprehends employment of the sleeve 22 in association with the resilient grommet.

In Figure 5 a grommet 18 of the type employed in Figure 4 is shown compressed between the cylinder head and block and confined by the sleeve 22, although the grommet 5 of Figure 2 would be compressed in a like manner. Figure 6 shows the grommet 13 of Figure 3 mounted and confined in a like manner.

The grommet in its various forms is preferably formed or molded of a resilient material such as compounded synthetic rubber which when the fastening bolts are tightened, will be compressed and give most effective sealing against any possible leakage of the oil or lubricant under pressure between or around the parts to be sealed. Although the novel grommet has been shown associated with the oil hole, it is to be understood that it is equally well adapted for sealing against leakage around the water holes.

Having thus disclosed my invention, I claim:

1. In a cylinder head gasket of the metal clad type having the usual service openings including an oil hole through which is transmitted oil under pressure for lubricating operating parts of the engine, a resilient rubber-like grommet mounted in the oil hole and provided with a heel portion projecting into the body of the gasket for anchoring the grommet in permanent location within the opening.

2. In a cylinder head gasket having the usual combustion openings, water and stud holes, an oil hole disposed outside the line of the stud holes for transmitting oil under pressure to operating parts of the engine, a resilient, non-metallic grommet anchored in the oil hole and having a portion normally projecting beyond a face of the gasket whereby when the gasket is compressed by the fastening means, the grommet is compressed and effectively seals against leakage.

3. In a cylinder head gasket having the usual combustion openings, water and stud holes, and an oil hole for transmitting oil under pressure to operating parts of the engine, a resilient, non-metallic grommet disposed in this oil hole and provided with an annular heel projecting into and anchored within the body of the gasket and having a part extending beyond the face of the gasket whereby when the gasket is mounted in position, the compression of the fastening means will compress the grommet and effectively seal thereat against leakage.

4. A cylinder head gasket of the metal clad type, comprising an upper and lower layer of metal and an intermediate layer of asbestos, an oil hole in the gasket for the transmission of lubricant under pressure, and a resilient, rubber-like grommet for sealing this oil hole against leakage and comprising an annular ring having a greater depth than the thickness of the surrounding gasket and an anchoring flange adapted to project into the space between the metal layers for uniting the grommet to the body of the gasket.

5. A cylinder head gasket of the metal clad type, comprising an upper and lower layer of metal and an intermediate layer of asbestos, an oil hole in the gasket for the transmission of lubricant under pressure, and a resilient, rubber-like grommet for sealing this oil hole against leakage and comprising an annular ring having a part extending beyond the face of a metal layer and means for anchoring the ring within the hole and thereby uniting the grommet to the gasket.

6. In a cylinder head gasket of the metal clad type having the usual service openings including water and oil holes, a resilient rubber-like grommet for sealing one or more of said holes and comprising an annular ring adapted to be inserted in the hole and projecting beyond a face of the gasket, and means for locating and anchoring the ring in fixed position within the hole.

7. In a cylinder head gasket of the metal clad type having the usual service openings including an oil hole through which is transmitted oil under pressure for lubricating operating parts of the engine, a resilient rubber-like grommet mounted in the oil hole and provided with a heel portion anchoring the grommet in permanent location within the opening, and means for confining the inner diameter of the grommet to obtain effective sealing of fluid under pressure.

8. In a cylinder head gasket having the usual combustion openings, water and stud holes, an oil hole disposed outside the line of the stud holes for transmitting oil under pressure to operating parts of the engine, a resilient, non-metallic grommet anchored in the oil hole and having a portion normally projecting beyond a face of the gasket whereby the grommet is compressed by the fastening means, and means for confining the material of the grommet against displacement into the oil hole upon such compression.

9. In a cylinder head gasket of the metal clad type having the usual service openings including water and oil holes, a resilient, rubber-like grommet for sealing one or more of said holes and comprising an annular ring adapted to be inserted in the hole and projecting beyond a face of the gasket, means for locating and anchoring the ring in fixed position within the hole, and means for preventing displacement of the material of the grommet into the hole being sealed when the gasket is mounted in operative position.

10. In a cylinder head gasket of the metal clad type adapted to be mounted between a cylinder head and block and having the usual service openings including water and oil holes, a rubber-like grommet for sealing one or more of said holes and comprising an annular ring adapted to be inserted in the hole and projecting beyond a face of the gasket, means for locating and anchoring the ring in fixed position within the hole, and a sleeve fitted into the adjoining surfaces of the cylinder head and block and encompassed by the grommet for preventing displacement of the material of the grommet into the hole being sealed when the gasket is mounted in operative position.

ALBERT JOHN AUKERS.